US008597148B2

(12) United States Patent
Ziemer

(10) Patent No.: US 8,597,148 B2
(45) Date of Patent: Dec. 3, 2013

(54) BEARING ARRANGEMENT FOR A SHIFT

(75) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/375,793

(22) PCT Filed: May 19, 2010

(86) PCT No.: PCT/EP2010/056905
§ 371 (c)(1),
(2), (4) Date: Dec. 2, 2011

(87) PCT Pub. No.: WO2010/139555
PCT Pub. Date: Dec. 9, 2010

(65) Prior Publication Data
US 2012/0093449 A1    Apr. 19, 2012

(30) Foreign Application Priority Data

Jun. 4, 2009  (DE) .......................... 10 2009 026 706

(51) Int. Cl.
*F16H 47/02*    (2006.01)
(52) U.S. Cl.
USPC .......................................... 475/61
(58) Field of Classification Search
USPC .......................................... 475/61, 138, 159
See application file for complete search history.

(56) References Cited

U.S. PATENT DOCUMENTS

| 2,079,999 | A | * | 5/1937 | Woolley .......................... 74/337 |
| 3,131,582 | A | * | 5/1964 | Kelbel ........................... 475/136 |
| 3,444,972 | A | * | 5/1969 | Carstensen et al. ........ 192/85.18 |
| 3,650,353 | A | * | 3/1972 | Abbott .......................... 184/6.12 |
| 4,359,145 | A |   | 11/1982 | Huff |
| 4,663,989 | A | * | 5/1987 | Brodbeck ..................... 475/159 |
| 5,013,287 | A | * | 5/1991 | Hayakawa et al. ............. 475/61 |
| 5,019,022 | A |   | 5/1991 | Uhlig et al. |
| 5,020,385 | A | * | 6/1991 | Bader ............................. 74/333 |
| 5,667,330 | A |   | 9/1997 | Henkel et al. |
| 5,679,096 | A |   | 10/1997 | Stine et al. |
| 5,912,785 | A | * | 6/1999 | Aoyagi ..................... 360/99.08 |
| 6,079,539 | A |   | 6/2000 | Fetcho et al. |
| 6,131,686 | A |   | 10/2000 | Scotti et al. |
| 7,198,143 | B2 |  | 4/2007 | Legner |
| 7,278,942 | B2 |  | 10/2007 | Klemen et al. |
| 7,331,894 | B2 |  | 2/2008 | Sowul et al. |
| 7,357,235 | B2 |  | 4/2008 | Schmidt et al. |
| 7,419,041 | B2 |  | 9/2008 | Diemer et al. |
| 7,789,792 | B2 |  | 9/2010 | Kamm et al. |
| 2006/0040782 | A1 | | 2/2006 | Diemer et al. |
| 2009/0163314 | A1 | | 6/2009 | Bock et al. |
| 2009/0301248 | A1 | | 12/2009 | Mohr et al. |
| 2010/0043586 | A1 | | 2/2010 | Mohr et al. |

FOREIGN PATENT DOCUMENTS

| CH | 304 821 | 1/1955 |
| DE | 634 500 | 12/1934 |
| DE | 866 290 | 7/1949 |
| DE | 1 550 769 | 7/1969 |

(Continued)

*Primary Examiner* — Vicky Johnson
(74) *Attorney, Agent, or Firm* — Davis & Bujold, PLLC; Michael J. Bujold

(57) ABSTRACT

A bearing arrangement for a shaft, particularly a driveshaft (1) in a transmission housing (5) of an automatic transmission with an actuating piston (6) of a shifting element arranged inside the shaft. At least one self-sealing bearing is provided at least on the side of the transmission housing (5) remote from the motor to support the shaft.

9 Claims, 2 Drawing Sheets

(56) References Cited

FOREIGN PATENT DOCUMENTS

| | | |
|---|---|---|
| DE | 2 316 560 | 10/1973 |
| DE | 2 246 123 | 3/1974 |
| DE | 39 28 133 A1 | 3/1990 |
| DE | 38 36 956 A1 | 5/1990 |
| DE | 199 01 414 A1 | 7/2000 |
| DE | 697 07 954 T2 | 6/2002 |
| DE | 102 29 515 A1 | 1/2004 |
| DE | 103 05 434 A1 | 7/2004 |
| DE | 103 34 450 A1 | 2/2005 |
| DE | 10 2005 035 156 A1 | 3/2006 |
| DE | 10 2005 037 402 A1 | 3/2006 |
| DE | 10 2005 038 925 A1 | 3/2006 |
| DE | 10 2005 002 337 A1 | 8/2006 |
| DE | 10 2006 022 176 A1 | 11/2007 |
| DE | 10 2006 049 274 A1 | 4/2008 |
| DE | 10 2006 049 281 A1 | 4/2008 |
| DE | 10 2008 010 064 A1 | 8/2009 |
| GB | 1 367 433 | 9/1974 |
| GB | 2 368 102 A | 4/2002 |
| WO | 2005/008096 A1 | 1/2005 |

\* cited by examiner

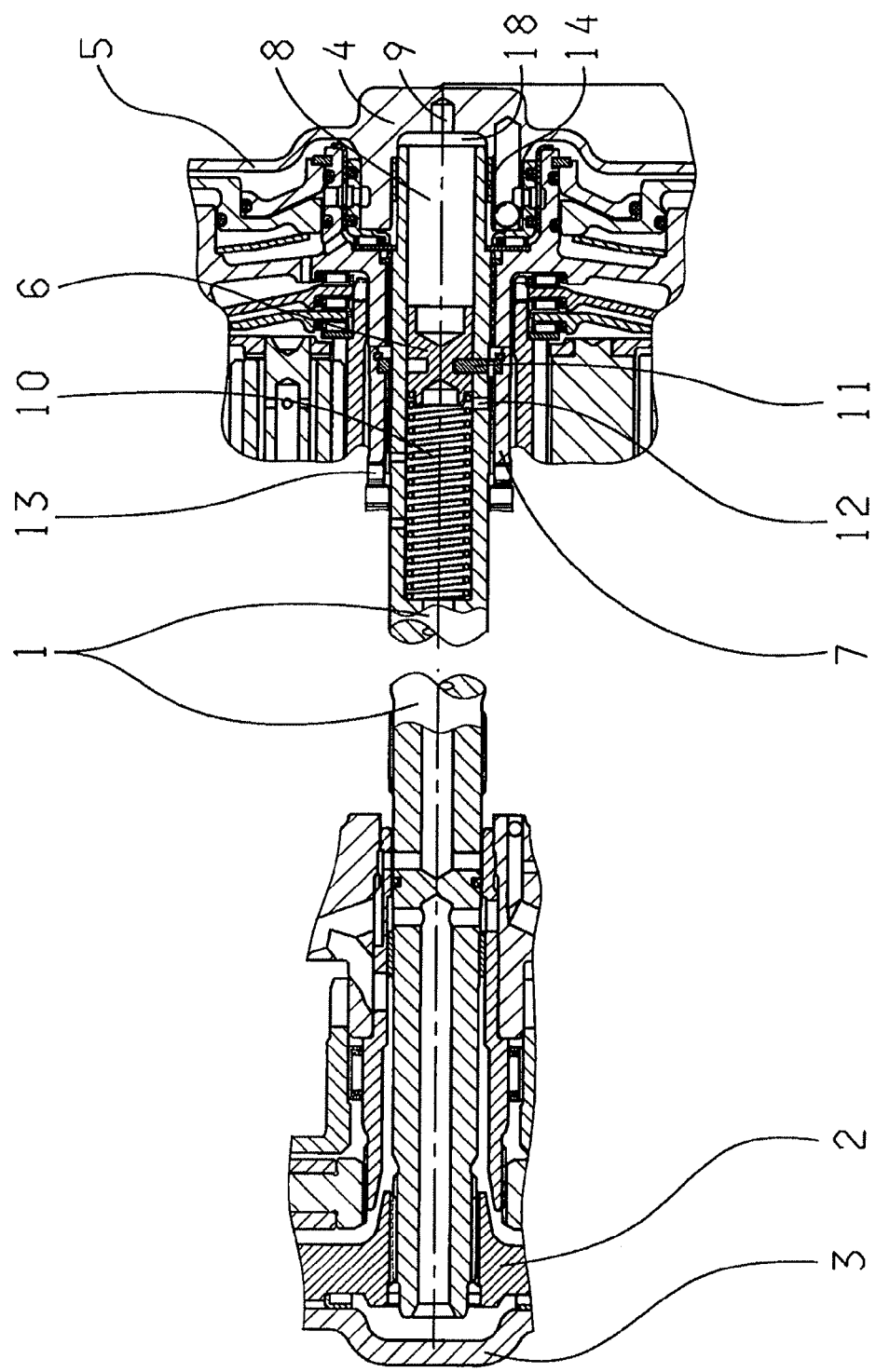

BEARING ARRANGEMENT FOR A SHIFT

This application is a National Stage completion of PCT/EP2010/056905 filed May 19, 2010, which claims priority from German patent application serial no. 10 2009 026 706.9 filed Jun. 4, 2009.

FIELD OF THE INVENTION

The present invention concerns a bearing arrangement for a shaft, in particular a driveshaft, in a transmission housing of an automatic transmission.

BACKGROUND OF THE INVENTION

Bearing arrangements for shafts and driveshafts in automatic transmissions are known from automotive technology. Usually, for example when a torque converter is used, the driveshaft is mounted on the transmission input side by means of a radial bearing in a guide-wheel shaft. In known bearing arrangements, on the side remote from the motor or the torque converter a radial bearing is also provided, by means of which the driveshaft is supported in the transmission housing. In this type of mounting the driveshaft is secured in the axial direction by abutments in the form of steps on the shaft, these steps being in contact with axially fixed structural elements that run at least without any rotational speed difference.

Now, to incorporate in the automatic transmission a largely fitting-space-neutral shifting element, for example a claw shifting element, it is provided that an actuating piston for the shifting element is arranged centrally inside the driveshaft. The actuating piston is acted upon with pressure medium or oil, and can when necessary be moved axially against the force of a restoring spring. On the actuating piston are provided a plurality of drive-pins, which project radially through openings in the driveshaft and correspondingly actuate the shifting claw of the claw shifting elements.

SUMMARY OF THE INVENTION

The purpose of the present invention is to propose a bearing arrangement of the type described at the start, which provides as simply designed and inexpensive a bearing as possible for the shaft, as well as a pressure medium seal for the actuating piston in the shaft.

According to these a bearing arrangement for a shaft is proposed, for example a driveshaft but also for other shafts in a transmission housing of an automatic transmission, such that an actuating piston for actuating a shifting element is arranged centrally in the shaft. According to the invention, to mount the shaft, at least one self-sealing bearing or the like is provided on the side of the transmission housing remote from the motor. In this way the proposed bearing arrangement for mounting, for example, the driveshaft can comprise the self-sealing bearing at least in the area of the side remote from the motor, so that the bearing is used at the same time for sealing in the pressure medium used for actuating the piston and the pressure oil inlet leading to the actuating piston is sealed relative to the inside space of the transmission. Consequently, further sealing components can advantageously be omitted, so that less structural fitting space is needed.

In an advantageous embodiment variant of the invention it can be provided that a slide bearing or the like is used as the self-sealing bearing. Other bearing options are also conceivable. For example, a roller bearing with a rectangular ring seal or the like can also be used. However, the slide bearing has clear advantages in relation to the fitting space required.

According to a possible design of the invention it can be provided that the bearing, for example the slide bearing, is press-fitted into a bore in a cover of the transmission housing or directly in the housing, so that the shaft, for example the driveshaft, is mounted and can rotate in the slide bearing held in the bore in the cover or transmission housing. Since in this version the bearing is arranged in the plane of the cover, in an advantageous manner only small bending moments are produced.

In a related further development of the invention the hub area of the cover of the transmission housing can also be provided with a spindle which is inserted in a bore in the shaft, so that the driveshaft is supported and can rotate on the spindle. Thus, no slide bearing is needed and further costs can therefore be saved. In this case the self-sealing bearing is realized by directly mounting the driveshaft or other shaft on the hub or on the spindle fixed to the housing. A further advantage is that the material of the driveshaft is usually steel and the material of the transmission housing is usually aluminum, so that as the temperature rises and the pressure medium therefore becomes less viscous, leakage remains only slight, since the gap between the spindle and the shaft becomes smaller because the thermal expansion coefficient of aluminum is larger compared with that of steel.

In a related design of the invention it can be provided that the slide bearing is press-fitted into the bore of the shaft, so that the shaft with the bearing is mounted and can rotate on the spindle fixed to the housing. The transmission housing or its cover can, for example, be made of aluminum. Then a sleeve or the like can be press-fitted onto the spindle, the material of which is compatible with the material of the slide bearing. Overall, this type of bearing has the advantage that with similar surroundings the shaft or driveshaft can be made shorter, there is less dead volume, and due to the smaller diameter the relative speed is lower.

It is also conceivable that in the proposed bearing arrangement the bearing is press-fitted into the bore of the driveshaft so that the shaft, with its bearing, is mounted on a bolt or the like pressed into the cover of the transmission housing. This has the advantage that the bearing zone of the shaft or driveshaft is formed considerably more rigidly.

BRIEF DESCRIPTION OF THE DRAWINGS

Below, the present invention is explained in more detail with reference to the drawings, which show:

FIG. 1: A schematic, sectioned partial view of a first possible embodiment variant of a bearing arrangement according to the invention for a driveshaft in an automatic transmission;

DETAILED DESCRIPTION OF THE PREFERRED EMBODIMENTS

Figure 4:
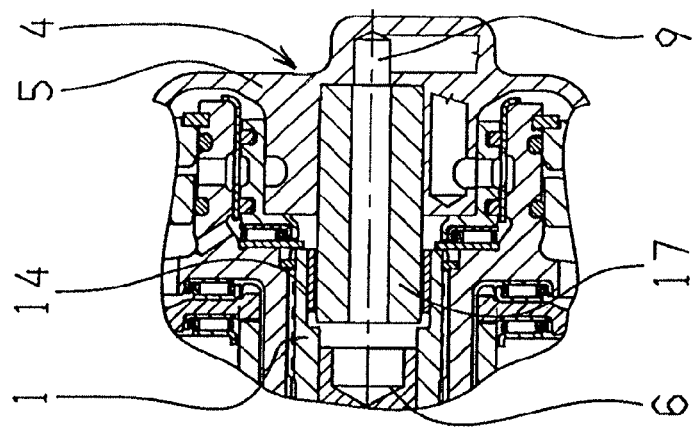
FIG. 4: A schematic, sectioned partial view of a fourth embodiment variant of a bearing arrangement.

FIG. 1 shows, as an example, a first embodiment variant of a bearing arrangement for a driveshaft 1 of an automatic transmission of planetary design, represented only partially, the components of the planetary stages not being indicated any further. On the motor side, the driveshaft 1 is coupled to a converter hub 2 of a torque converter 3, so the proposed bearing arrangement mainly concerns the bearing on the side remote from the motor or torque converter 3, since the bearing on the motor side can be chosen to be of any desired type because it does not require a seal. Associated with the end of the driveshaft 1 remote from the torque converter 3 is a hub 4 of the transmission housing 5.

Regardless of the embodiment variant considered, inside the driveshaft 1 is an actuating piston 6 for actuating a claw shifting element 7. The actuating piston 6 is arranged and can move axially within a bore 8 of the driveshaft 1, and the actuating piston 6 can be acted upon, via an oil supply duct 9, with oil as a pressure medium. Thereby, the actuating piston 6 can be moved to the left in the plane of the drawing, against the force of a restoring spring 10. The actuating piston 6 has a plurality of drive-pins 11, which extend in the radial direction through a slot 12 in the driveshaft 1 in order to actuate the shifting claw 13 of the claw shifting element 7.

To create a pressurized oil seal for the pressure medium supply of the actuating piston 6, according to the invention, it is provided that to support the driveshaft 1 on its side remote from the torque converter 3 at least one self-sealing bearing is provided. In this way, on the one hand the driveshaft 1 is supported, and on the other hand the oil for acting upon the actuating piston 6 is prevented from escaping into the part of the transmission housing 5 that is not pressurized.

In the first embodiment variant shown in FIG. 1, the driveshaft 1 is supported on the transmission housing 5 by a self-sealing bearing in the form of a slide bearing 14. For this purpose the slide bearing 14 is press-fitted into a bore 18 in the hub 4 of the transmission housing 5. The driveshaft 1 rotates within the slide bearing 14. Thus, the slide bearing 14 is located in the plane of the cover in order to produce the lowest possible bending moments. In this embodiment variant the slide bearing 14 prevents oil from passing through to the remaining, pressure-free space of the transmission housing 5.

Figure 2:
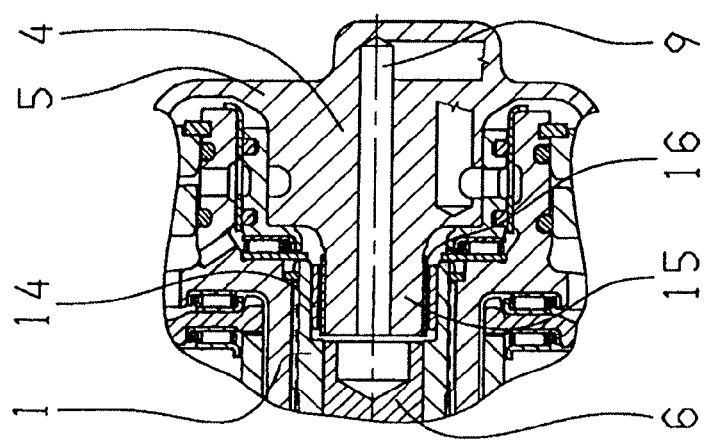
FIG. 2: A schematic, sectioned partial view of a second embodiment variant of a bearing arrangement.

FIG. 2 shows a second embodiment variant of the bearing arrangement according to the invention. In this second embodiment variant the slide bearing 14 is press-fitted into the bore 8 in the driveshaft 1. The actuating piston 6 is provided farther along the bore 8. The slide bearing 14 in the driveshaft 1 rotates on a spindle 15 formed on or attached to the hub 4. Onto the spindle 15 is pressed a sleeve or bush 16, which is made of a material compatible with the material of the slide bearing 14. With this design of the bearing of the driveshaft 1, the driveshaft 1 can be made particularly short. In this case too, oil from the oil supply duct 9 or from the bore 8 of the driveshaft 1 is prevented from entering into the remaining, pressure-free space of the transmission housing 5.

Figure 3:
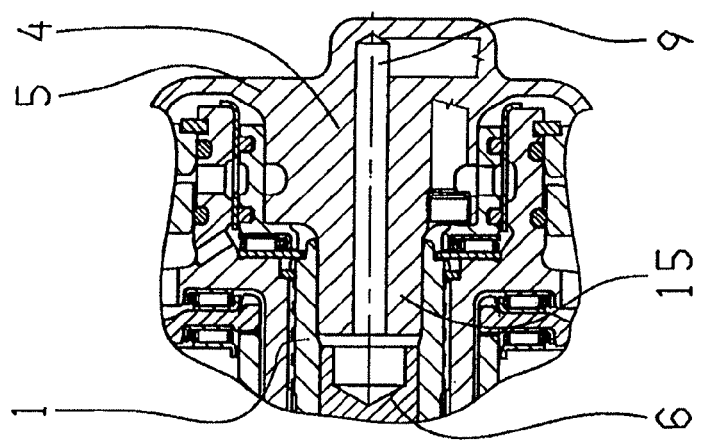
FIG. 3: A schematic, sectioned partial view of a third embodiment variant of a bearing arrangement.

FIG. 3 shows a third embodiment variant of the bearing arrangement according to the invention, in which, in contrast to the second embodiment variant, no slide bearing 14 and also no sleeve 16 are provided. Thus, a bearing working surface is provided as the self-sealing bearing between the spindle 15 and the inside diameter of the bore 8 in the driveshaft 1. Since the driveshaft 1 is preferably made of steel and the spindle 15 preferably of aluminum, there is less leakage if the temperature rises since the gap between the spindle 15 and the driveshaft 1 becomes smaller because the thermal expansion coefficient of aluminum is larger than that of steel.

Finally, FIG. 4 shows a fourth possible embodiment variant of the proposed bearing arrangement, in which, compared with the second embodiment variant, the sleeve 16 is replaced by a bolt 17 press-fitted into the transmission housing 5 or the hub 4. This makes it possible for the bearing zone to be substantially more rigid.

INDEXES

1 Driveshaft
2 Converter hub
3 Torque converter
4 Hub
5 Transmission housing or cover of the transmission housing
6 Actuating piston
7 Claw shifting element
8 Bore in the driveshaft
9 Oil supply duct
10 Restoring spring
11 Drive-pins
12 Slot
13 Shifting claw
14 Slide bearing
15 Spindle
16 Sleeve
17 Bolt
18 Bore in the hub 4

The invention claimed is:

1. A bearing arrangement for a driveshaft (1) in a transmission housing (5) of an automatic transmission,
   the bearing arrangement supporting the driveshaft, the driveshaft being rotatable about a central axis via the bearing arrangement,
   an actuating piston (6) of a shifting element (7) being arranged inside the driveshaft and being axially slidable within the driveshaft along the central axis,
   an oil supply duct (9) communicating with the actuating piston (6), and the oil supply duct (9) supplying a pressure medium which facilitates shifting movement of the shifting element (7) along the central axis,
   at least one self-sealing bearing forming a pressure medium seal between the driveshaft (1) and the transmission housing (5) for preventing the pressure medium from escaping into an unpressurized portion of the transmission housing (5), and
   the bearing arrangement being provided at least on a side of the driveshaft adjacent and proximate to the transmission housing (5) and remote from a drive input.

2. The bearing arrangement according to claim 1, wherein the self-sealing bearing is a slide bearing (14).

3. The bearing arrangement according to claim 2, wherein the slide bearing (14) is press-fitted into a bore (18) in a hub (4) of the transmission housing (5), and the driveshaft (1) is retained and rotatable in the slide bearing (14) located in the bore (18) of the hub (4).

4. The bearing arrangement according to claim 2, wherein the slide bearing (14) is press-fitted into a bore (8) of the driveshaft (1) such that the driveshaft (1), with the slide bearing (14), is supported and is rotatable on a spindle (15), and the spindle (15) is formed as part of the transmission housing (5).

5. The bearing arrangement according to claim 2, wherein the slide bearing (14) is press-fitted into a bore (8) of the driveshaft (1) such that the driveshaft (1), with the slide bearing (14), is supported and rotatable on a bolt (17) pressed into a hub (4) of the transmission housing (5).

6. The bearing arrangement according to claim 1, wherein a spindle (15) is formed on a hub (4) of the transmission housing (5), which is inserted into a bore (8) of the driveshaft (1), so that the driveshaft (1) is supported and rotatable on the spindle (15).

7. The bearing arrangement according to claim 6, wherein a sleeve (16) is pressed onto the spindle (15).

8. The bearing arrangement according to claim 6, wherein the spindle (15) is made of aluminum and the driveshaft (1) is made of steel.

9. A bearing arrangement for a driveshaft (1) in a transmission housing (5) of an automatic transmission, the driveshaft (1) having a drive input first end and an axially opposite second end, and an axial bore,
- the driveshaft (1) comprises a piston (6) of a shifting element (7) that is axially slidable within the axial bore (8) formed in the second end of the driveshaft (1),
- a hub (4) of the transmission housing (5) supporting the second end of the driveshaft (1) such that the driveshaft (1) is rotatable with respect to the hub (4), and the hub (4) comprising an oil supply duct (9) communicating with the axial bore (8) for supplying pressurized oil to the axial bore (8) of the driveshaft, and
- at least one self-sealing bearing forming a pressurized oil seal between the second end of the driveshaft (1) and the hub (4) of the transmission housing (5) such that the pressurized oil, when supplied to the axial bore (8), pressurizes the axial bore (8), axially biases the piston (6) and induces shifting movement of a shifting element (7).

* * * * *